United States Patent
Daws

[19]

[11] Patent Number: 5,928,448
[45] Date of Patent: Jul. 27, 1999

[54] DOWEL ADHESIVE METHOD FOR REPAIR OF CERAMIC MATRIX COMPOSITES

[75] Inventor: David Eric Daws, Long Beach, Calif.

[73] Assignee: Northrop Grumman Corporation, Los Angeles, Calif.

[21] Appl. No.: 08/969,428

[22] Filed: Nov. 1, 1997

[51] Int. Cl.$^6$ .................................................. B29C 73/06
[52] U.S. Cl. ........................ 156/98; 29/402.11; 156/92; 156/94; 428/63
[58] Field of Search .................... 156/94, 98, 92; 29/402.09, 402.11; 428/63, 223

[56] References Cited

U.S. PATENT DOCUMENTS

| | | |
|---|---|---|
| 2,252,986 | 8/1941 | Scott . |
| 2,482,925 | 9/1949 | Mercer . |
| 2,583,396 | 1/1952 | Skoog . |
| 2,722,734 | 11/1955 | Grant ........................................... 156/94 |
| 2,951,506 | 9/1960 | Diperstein . |
| 3,551,234 | 12/1970 | Britton ......................................... 156/98 |
| 3,616,117 | 10/1971 | Anderson et al. . |
| 3,986,913 | 10/1976 | Walz ............................................ 156/98 |
| 4,235,952 | 11/1980 | Holmes et al. . |
| 4,256,790 | 3/1981 | Lackman et al. . |
| 4,350,728 | 9/1982 | Huang et al. . |
| 4,409,270 | 10/1983 | Faber et al. . |
| 4,507,011 | 3/1985 | Brown . |
| 4,554,036 | 11/1985 | Newsom . |
| 4,737,330 | 4/1988 | Rau . |
| 4,793,879 | 12/1988 | Mimbs . |
| 4,861,643 | 8/1989 | Scollard . |
| 4,916,880 | 4/1990 | Westerman, Jr. . |
| 4,984,347 | 1/1991 | Cox . |
| 5,023,987 | 6/1991 | Wuepper et al. . |
| 5,093,171 | 3/1992 | Sheahan . |
| 5,102,723 | 4/1992 | Pepin . |
| 5,190,611 | 3/1993 | Cologna et al. . |
| 5,268,338 | 12/1993 | Gerberick ................................. 501/109 |
| 5,320,494 | 6/1994 | Reinfelder et al. . |
| 5,350,447 | 9/1994 | Copes . |

*Primary Examiner*—Daniel Stemmer
*Attorney, Agent, or Firm*—Terry J. Anderson; Karl J. Hoch, Jr.

[57] ABSTRACT

The present invention is a dowel-adhesive method for repairing ceramic matrix composites. The dowel adhesive method embodied in the present invention incorporates both adhesive and mechanical bonding of a patch to a damaged CMC surface area. The damaged area is first identified and then pre-processed. Next, a CMC patch plug is produced and adhesively and mechanically bonded to the pre-processed area. Mechanical bonding is accomplished with dowel pins and corresponding dowel pin holes in the patch plug and the panel. The dowel pins anchor the CMC patch plug to the panel. Adhesive bonding is accomplished by placing a ceramic adhesive between the patch plug and the panel. Also, the dowel pins are adhesively bonded within the dowel pin holes of the plug and the panel. The ceramic adhesive is set by a low temperature cure (if required) and a high temperature firing.

17 Claims, 2 Drawing Sheets

DOWEL ADHESIVE METHOD FOR REPAIR OF CERAMIC MATRIX COMPOSITES

BACKGROUND OF THE INVENTION

1. Field of the Invention

The present invention relates in general to the repair of ceramic matrix composite materials and in particular to a dowel-adhesive method for repairing ceramic matrix composites.

2. Related Art

A great deal of effort has been devoted to the development of ceramic matrix composites (CMC) for high-temperature structural applications. These CMC materials are used for many different types of parts. During the life of a part made of a CMC material, service methods of repairing damage must be available. In particular, repair methods that do not require removal of the CMC part from the structure are very desirable.

Basically, there are two primary repair methods: adhesive based repairs and mechanically based repairs. Adhesive based repairs utilize an adhesive to bond a patch to a prepared surface. Mechanically based repairs use fasteners (e.g. rivets) to attach a patch to a prepared surface. Polymer matrix composites are usually repaired using adhesives exclusively while metallic components are normally repaired using mechanical means exclusively, such as rivets or fasteners. However, due to the brittle nature of ceramics and ceramic adhesives, neither mechanical nor adhesive based repairs alone will produce an effective repair.

Therefore, what is needed is an adhesive method for repairing ceramic matrix composites with both adhesive and mechanical bonding approaches. What is also needed is an inexpensive method for repairing CMC materials. What is also needed is a reliable repair method. Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a dowel-adhesive method for repairing ceramic matrix composites. The dowel-adhesive method embodied in the present invention incorporates both adhesive and mechanical bonding of a patch to a damaged CMC surface area.

The damaged area is first identified and then pre-processed. Next, a CMC patch plug is produced and adhesively and mechanically bonded to the pre-processed area. Mechanical bonding is accomplished with dowel pins and corresponding dowel pin holes in the patch plug and the panel. The dowel pins anchor the CMC patch plug to the panel. Adhesive bonding is accomplished by placing a ceramic adhesive between the patch plug and the panel. Also, the dowel pins are adhesively bonded within the dowel pin holes of the plug and the panel. The ceramic adhesive is set by a low temperature cure and a high temperature firing.

A feature of the present invention is the incorporation of dual bonding methods, adhesive and mechanical, of a patch plug to a CMC surface. Another feature of the present invention is the addition of reinforcing agents to the adhesive. An advantage of the present invention is added reliability of dual bonding methods (adhesive and mechanical). Another advantage of the present invention is that the CMC repair of a part can be performed on site and does not require removal of the CMC part from the structure. For example, the method embodied in the present invention is amenable to on or off site CMC vehicle repair.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIGS. 2A–2H pictorially illustrate the repair process of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
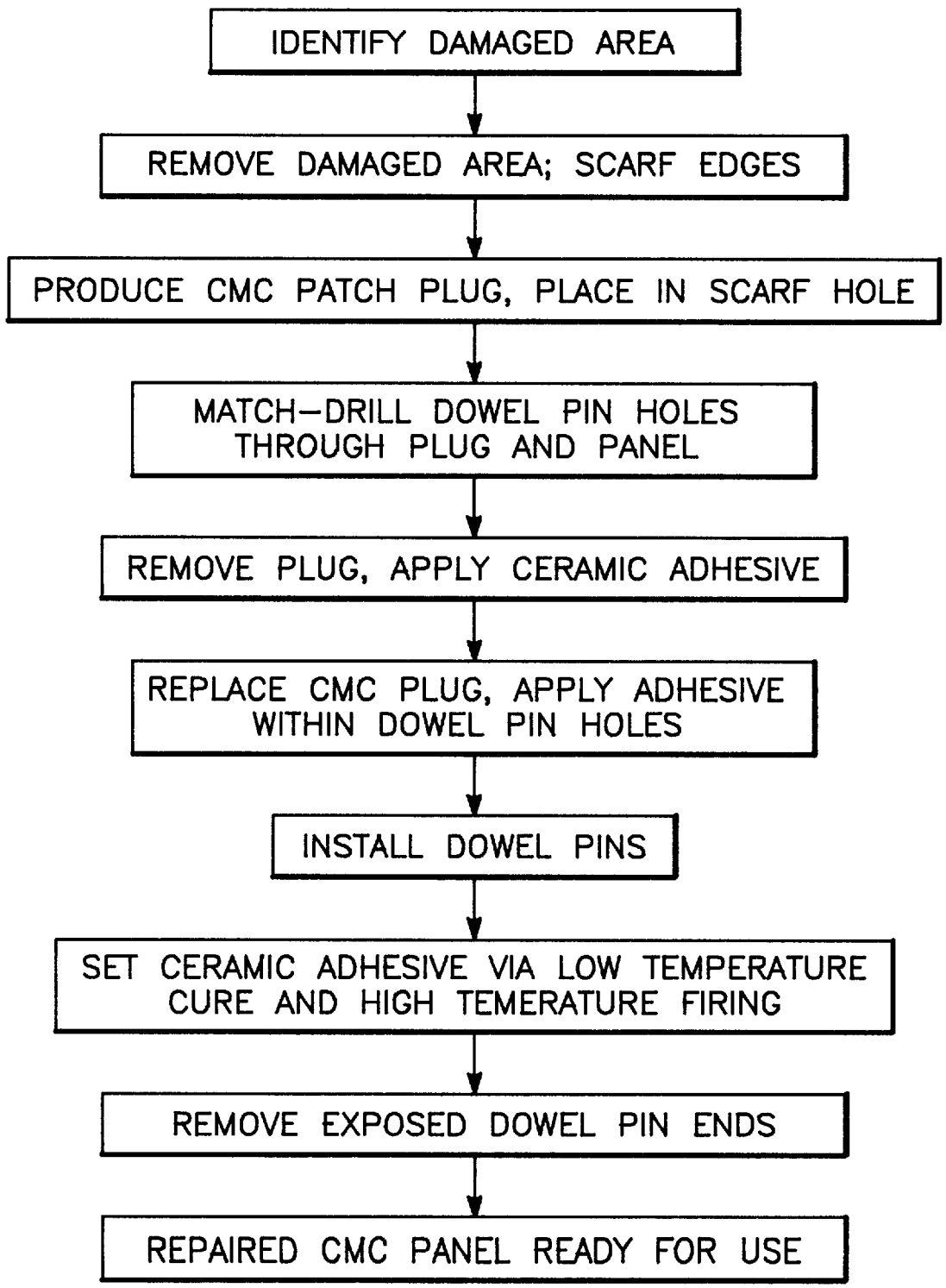
FIG. 1 is a flow chart illustrating the overall repair process of the present invention.
Figure 2A:
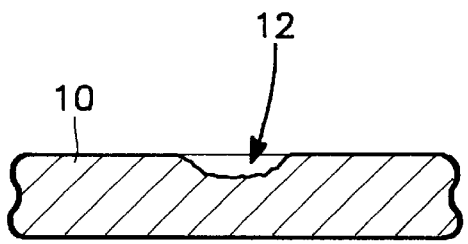
FIGS. 2A and 2H are side views of a damaged and a repaired CMC panel, respectively, of the present invention.

FIG. 1 is a flow chart illustrating the overall repair process of the present invention. FIG. 2A is a side view of a CMC substrate 10, such as a CMC panel with a damaged area 12. FIG. 2H is a side view of the CMC substrate 10 of FIG. 2A as a repaired CMC substrate 14 utilizing a dowel-adhesive method embodied in the present invention for repairing ceramic matrix composites. The dowel-adhesive method embodied in the present invention provides reliable and permanent repair to a damaged CMC substrate through a combination of chemical and mechanical means. Specifically, this method incorporates both ceramic adhesion and dowel pin mechanical bonding. The repaired CMC substrate 14 includes a patch 20, dowel pins 30, and strategically applied ceramic adhesive 26, as shown in FIGS. 2A–2H.

Operation

Figure 2E:
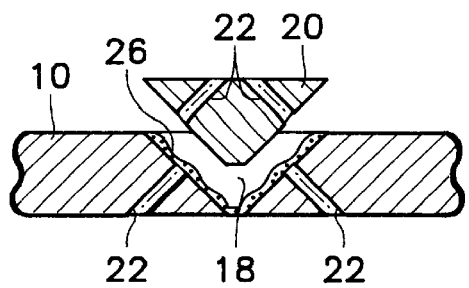
Figure 2B:
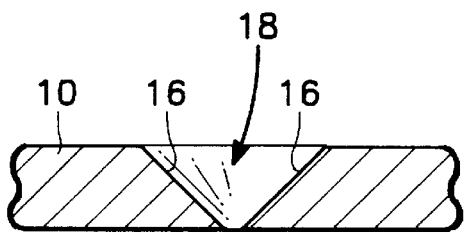
Figure 2F:
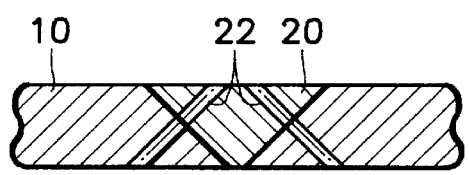
Figure 2C:
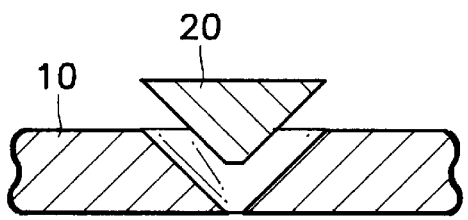
Figure 2G:
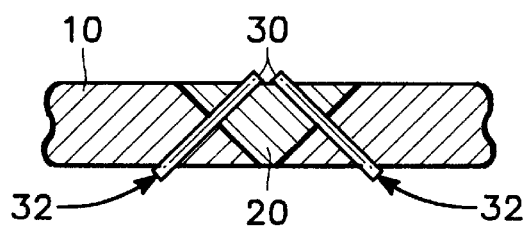
Figure 2D:
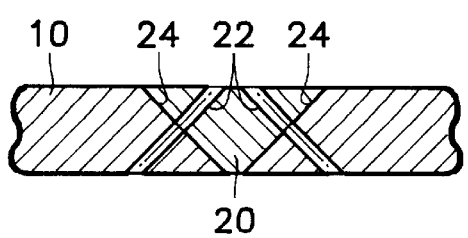
Figure 2H:
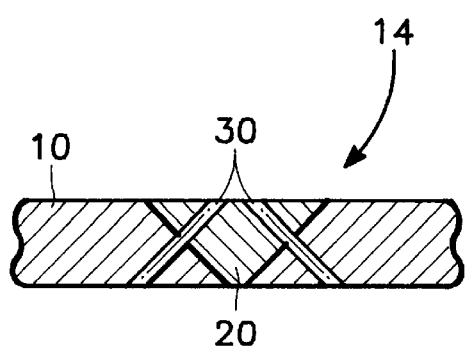

FIGS. 2A–2H pictorially illustrate the repair process of the present invention. Referring to FIG. 1 along with FIGS. 2A–2H, first, a damaged area 12 of the CMC substrate 10 is identified (as shown in FIG. 2A). Second, the damaged area 12 of the substrate 10 is removed and all edges 16 are scarfed. The scarfing leads to more surface area over which a ceramic adhesive (discussed below) can bond. The damaged area 12 of FIG. 2A is removed to preferably create a countersunk area 18 (as shown in FIG. 2B). A circular, rectangular, or triangular (although any geometry is possible) area is delineated as a countersunk area around the damaged area. For example, to create the countersunk area 18 of FIG. 2B, a delineated area can be cut from the panel with 45° angled sides (although any angle between 10° and 80° is possible depending on the surface and repair application). The minor diameter is recommended to be a minimum of ½-inch from the furthest extent of the damaged area. The countersunk area 18 is defined to provide enough surface area to enable use of dowel pins 30 (see FIG. 2G below) for reinforcement of a patch plug 20 (see FIG. 2C below).

Third, a patch plug 20, preferably made of a suitable ceramic or CMC material similar to the panel composition 10, is produced and placed in the scarfed countersunk area 18 (as shown in FIG. 2C). The patch plug 20 should fit securely within the previously cut countersunk area 18. This plug 20 can be made to fit any shape countersunk area 18. Fourth, dowel pin holes 22 are match-drilled through the plug 20 and the substrate 10 (as shown in FIG. 2D). The dowel pin holes 22 are preferably drilled perpendicular to the sides 24 of the countersunk area 18 through both the plug 20 and substrate 10 (as shown in FIG. 2D). The dowel pin holes 22 are preferably canted so as to be perpendicular to the sidewall(s) of the patch plug 20 (i.e. not perpendicular to the repaired surface). The appropriate number of holes to be drilled can be established on a case-by-case basis.

Fifth, the plug 20 is temporarily removed from the scarfed countersunk area 18 and a ceramic adhesive 26 is applied to the surface of the countersunk area 18 (as shown in FIG. 2E). Any ceramic adhesive available that works effectively with the substrate 10 to be repaired can be used. For example, high-temperature ceramic-based adhesives such as glass frits, polymeric precursors for ceramic material, Blackglas resin, Aremco-brand adhesives, etc. can be used. The adhesive may also be reinforced through the use of a reinforcing agent, such as ceramic whiskers, particulates, fibers, fabric, and/or non-woven fibrous mat. These reinforcing agents may be used to ensure that the patch properties meet application needs, such as thermal expansion, electrical continuity, thermal diffusivity, etc. as well as structural integrity.

Sixth, the patch plug 20 is replaced in the scarfed countersunk area 18 and the ceramic adhesive 26 is applied and inserted within the dowel pin holes 22 (as shown in FIG. 2F). Seventh, dowel pins 30 are installed within the dowel pin holes 22 (as shown in FIG. 2G). The dowel pins 30 are preferably high-temperature ceramic-based pins made of a suitable ceramic or CMC material similar to the panel composition. Also, Blackglas CMC can be used as the dowel pins (e.g. Blackglas reinforced with continuous longitudinal fibers). Processing would then include curing, pyrolysis, and possible resin re-infiltration. It should be noted that the dowel pins 30 can be either uncured or already-cured and pyrolyzed pins. Uncured pins can be co-cured with the laminate or pre-cured repair pins can be used with cured substrates.

Eighth, the damaged area with the patch plug 20 is processed to set the adhesive 26, including curing, pyrolysis, melt-processing, etc. The ceramic adhesive 26 can be set, for example, by initially performing a low temperature cure and then performing a high temperature firing. Further, chemical activation of the area to be repaired can be performed to enhance the bond between the materials to be adhered by the adhesive 26.

Last, following adhesive-set processing, any exposed dowel pin ends 32 are removed. Namely, the protruding ends 32 of the dowel pins 30 can be removed via surface cutting, etc. from either or both sides of the substrate 10 to produce a smooth surface. With the process embodied in the present invention, an effective CMC repair that encompasses both adhesive and mechanical bonding is completed. It should be noted that the experimental repair of Blackglas CMC with the method embodied in the present invention has proved successful.

The method embodied in the present invention is reliable, strong, and permanent. Also, this method can be used in a wide variety of CMC parts. For instance, since the patch plug 20 of the present invention is held in place automatically by the dowel pins 30, a CMC part having a substrate panel 10 with a substructure (such as foam, etc.) existing below the panel, such as a composite face sheet, can be easily repaired. In fact, panels with substructures may actually assist in effective alignment of the patch of the present invention. As such, the method embodied in the present invention can repair non-hollow bodies, such as face sheets attached to ceramic foam substructures, as well as hollow bodies, making this method more versatile than currently available repair methods.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A dowel-adhesive method for repairing a damaged area of a ceramic matrix composite material, comprising the steps of:
    (a) removing the damaged area of the material to define a repair area with sides;
    (b) producing a patch plug having sidewalls, wherein said patch plug fits securely within said removed area;
    (c) creating a plurality of matching dowel pin holes through said patch plug and said material;
    (d) applying a ceramic adhesive to said sides of said repair area;
    (e) placing said patch plug in said repair area;
    (f) applying said ceramic adhesive within said dowel pin holes;
    (g) inserting a plurality of dowel pins within said dowel pin holes;
    (h) processing the damaged area with said ceramic adhesive and patch plug to set said ceramic adhesive, including curing, pyrolyzing, and melt-processing said ceramic adhesive to create an adhesive bond between said patch plug, said dowel pins and said repair area; and
    (i) removing protruding portions of said repair area to produce a smooth surface.

2. The method as set forth in claim 1, further comprising, after step (a), the step of scarfing all edges for creating additional bonding surface area for said ceramic adhesive.

3. The method as set forth in claim 1, wherein said repair area is a delineated area forming 45° angled sides.

4. The method as set forth in claim 1, wherein said repair area is a delineated area forming sides having angles in the range between 10° and 80°.

5. The method as set forth in claim 1, wherein said patch plug is made of a ceramic material substantially identical to the ceramic matrix composite material.

6. The method as set forth in claim 1, wherein said dowel pin holes are created to be canted to said sides of said repair area through both said patch plug and said material.

7. The method as set forth in claim 6, wherein said dowel pin holes are canted so as to be perpendicular to the sidewalls of said patch plug.

8. The method as set forth in claim 1, wherein said ceramic adhesive is a high-temperature ceramic-based adhesive.

9. The method as set forth in claim 1, wherein said ceramic adhesive is reinforced with a reinforcing agent, consisting of at least one of ceramic whiskers, particulates, fibers, fabric, and non-woven fibrous mats.

10. The method as set forth in claim 1, wherein said dowel pins are high-temperature ceramic-based pins made of a ceramic/ceramic matrix composite material substantially identical to the damaged area of said ceramic matrix composite material.

11. The method as set forth in claim 1, wherein said dowel pins are a reinforced ceramic matrix composite material with continuous longitudinal fibers.

12. The method as set forth in claim 1, wherein said ceramic adhesive is set by initially performing a low temperature cure and then performing a high temperature firing.

13. The method as set forth in claim 1, wherein said dowel pins are uncured dowel pins and wherein said step (h) further comprises co-curing said dowel pins with said ceramic adhesive.

14. The method as set forth in claim 1, wherein said dowel pins are pre-cured and pre-pyrolyzed dowel pins with cured substrates.

15. A repaired ceramic matrix composite material, comprising:

a patch plug having sidewalls securely fitted within a damaged area;

a plurality of matching dowel pin holes located in said patch plug and adjacent said damaged area;

a plurality of dowel pins located within said plurality of dowel pin holes;

a cured ceramic adhesive adhering said patch plug to sides of said damaged area and adhering said dowel pins within said dowel pin holes.

16. The repaired ceramic matrix composite material of claim 15, wherein said patch plug is made of a ceramic material substantially identical to the damaged area.

17. The repaired ceramic matrix composite material of claim 15, wherein said ceramic adhesive is a high-temperature ceramic-based adhesive.

* * * * *